US010030171B2

(12) United States Patent
Agrawal et al.

(10) Patent No.: US 10,030,171 B2
(45) Date of Patent: Jul. 24, 2018

(54) WAX COATING AND ASSOCIATED METHODS OF USE (71) Applicants: Sarvesh K. Agrawal, Woolwich Township, NJ (US); Kent A. Baschwitz, Downingtown, PA (US); Larry E. Hoch, Yardley, PA (US)

(72) Inventors: Sarvesh K. Agrawal, Woolwich Township, NJ (US); Kent A. Baschwitz, Downingtown, PA (US); Larry E. Hoch, Yardley, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 209 days.

(21) Appl. No.: 14/980,336

(22) Filed: Dec. 28, 2015

(65) Prior Publication Data
US 2016/0222251 A1    Aug. 4, 2016

Related U.S. Application Data (60) Provisional application No. 62/101,580, filed on Jan. 9, 2015.

(51) Int. Cl.
*C09D 5/00* (2006.01)
*C09D 191/00* (2006.01)
(Continued)

(52) U.S. Cl.
CPC ............ *C09D 191/06* (2013.01); *C08J 7/047* (2013.01); *C08L 91/06* (2013.01); *C09D 5/00* (2013.01);
(Continued)

(58) Field of Classification Search
None
See application file for complete search history.

(56) References Cited

U.S. PATENT DOCUMENTS 3,146,184 A * 8/1964 Moyer ................ C09D 191/08
208/21
3,287,479 A   11/1966 Naudain
(Continued)

FOREIGN PATENT DOCUMENTS

JP        S51109978 A      9/1976
JP        01-060659 A  *   3/1989
(Continued)

OTHER PUBLICATIONS

The International Search Report and Written Opinion of PCT/US2015/067626 dated Apr. 8, 2016.
(Continued)

*Primary Examiner* — Vivian Chen
(74) *Attorney, Agent, or Firm* — Scott F. Yarnell (57) ABSTRACT

Wax compositions are provided with improved properties for various applications, such as coating of composite cellulosic materials, e.g., composite wood material, particleboard, medium density fiberboard, construction board or combination thereof. As described herein, paraffin wax compositions are provided that have n-paraffin content of from about 30% wt to about 95% wt, and a 95% carbon number spread of from about 1 carbon atoms to about 23 carbon atoms, which provide enhanced water proofing properties as compared to waxes currently used.

14 Claims, 5 Drawing Sheets

(51) Int. Cl.
| | |
|---|---|
| *C09D 191/06* | (2006.01) |
| *C09K 3/00* | (2006.01) |
| *C09K 3/18* | (2006.01) |
| *C08K 5/01* | (2006.01) |
| *C08J 7/04* | (2006.01) |
| *C08L 91/06* | (2006.01) |
| *D21H 17/60* | (2006.01) |
| *B32B 21/00* | (2006.01) |
| *B32B 21/02* | (2006.01) |
| *B32B 21/04* | (2006.01) |
| *C09K 3/10* | (2006.01) |

(52) U.S. Cl.
CPC .............. *B32B 21/00* (2013.01); *B32B 21/02* (2013.01); *B32B 21/04* (2013.01); *B32B 2307/7265* (2013.01); *B32B 2317/16* (2013.01); *B32B 2391/00* (2013.01); *C08J 7/04* (2013.01); *C08J 2301/02* (2013.01); *C08J 2491/06* (2013.01); *C08K 5/01* (2013.01); *C09D 191/00* (2013.01); *C09K 3/00* (2013.01); *C09K 3/18* (2013.01); *C09K 2003/1081* (2013.01); *D21H 17/60* (2013.01); *Y10T 428/31801* (2015.04); *Y10T 428/31804* (2015.04)

(56) References Cited

U.S. PATENT DOCUMENTS

| | | | | |
|---|---|---|---|---|
| 3,677,808 | A | | 7/1972 | Sheridan |
| 4,360,385 | A | * | 11/1982 | Grunewalder ......... B05D 1/045 106/18.29 |
| 4,404,239 | A | * | 9/1983 | Grunewalder ......... B05D 1/045 106/18.29 |
| 4,913,972 | A | * | 4/1990 | Grunewalder ........... B05D 7/08 427/303 |
| 5,228,905 | A | * | 7/1993 | Grunewalder ......... A01N 25/04 106/18.29 |
| 5,474,668 | A | * | 12/1995 | Ackerson ............. C10G 73/025 208/33 |
| 6,183,849 | B1 | | 2/2001 | Lindsay et al. |
| 6,830,614 | B2 | * | 12/2004 | Hudson ................ C09D 191/08 106/164.01 |
| 8,231,763 | B2 | * | 7/2012 | Buchholz ............... B27N 1/006 106/14.26 |
| 8,476,345 | B2 | * | 7/2013 | Buchholz ............... B27N 1/006 106/271 |
| 8,652,633 | B2 | | 2/2014 | Buchholz et al. |
| 8,748,516 | B2 | * | 6/2014 | Winterowd ........ C08G 18/6492 208/24 |
| 2004/0011244 | A1 | * | 1/2004 | Cui ..................... C09D 191/06 106/2 |
| 2005/0086853 | A1 | * | 4/2005 | Hudson .................. C11C 5/002 44/275 |
| 2006/0005317 | A1 | * | 1/2006 | Hashimoto ........... D06M 13/02 8/115.51 |
| 2006/0051619 | A1 | * | 3/2006 | Wantling ................ C04B 28/14 428/703 |
| 2006/0196391 | A1 | * | 9/2006 | Hassan .................. C04B 24/08 106/271 |
| 2010/0145114 | A1 | * | 6/2010 | Abhari ...................... C07C 1/22 585/1 |
| 2010/0304126 | A1 | * | 12/2010 | Wu ........................... B27N 7/00 428/326 |
| 2012/0214012 | A1 | * | 8/2012 | Briner ..................... B32B 21/08 428/541 |
| 2015/0108395 | A1 | * | 4/2015 | Yoshida ................. C09K 5/063 252/73 |
| 2015/0191404 | A1 | * | 7/2015 | Aalto ........................ C07C 1/22 585/16 |
| 2016/0122588 | A1 | * | 5/2016 | Agrawal ............. C09D 191/06 428/174 |
| 2017/0247573 | A1 | * | 8/2017 | Agrawal ................ B27N 7/005 |

FOREIGN PATENT DOCUMENTS

| | | | |
|---|---|---|---|
| JP | 09-111696 A | * | 4/1997 |
| JP | 2003-049398 A | * | 2/2003 |
| WO | 1999024233 A1 | | 5/1999 |
| WO | 03/097763 A1 | | 11/2003 |
| WO | 2004/061042 A1 | | 7/2004 |
| WO | 2007/050964 A1 | | 5/2007 |

OTHER PUBLICATIONS

Young, "Practical Applications of Gas Chromatography in Paints and Coatings Industry," Analysis of Paints and Related Materials: Current Techniques for Solving Coating Problems, 1992, ASTM STP 1119, pp. 105-124, American Society for Testing and Materials (ASTM), Philadelphia.
Meyer, "Interactions between chain length distributions, crystallization behavior and needle penetration of paraffin waxes, " Erdol-Erdgas-Kohle Journal, 2006, 122.Jb, 1, S.16-18.
Hsu et al., "Water repellant efficacy of wax used in hardboard," Industrial & Engineering Chemistry Research, 1988, vol. 27, iss. 7, pp. 1296-1300, ACS Publications.
Roffael, et. al., "Paraffin sizing of particleboards: chemical aspect." In. Maloney, Thomas M., ed. Proceedings, 17th international particleboard/composite materials symposium, 1983.
Roffael, et al., "For waterproofing medium density fiberboard with paraffins Part 1: influence of the chemical composition of the paraffin and the type of emulsifier on the waterproofing of MDF", Wood as raw materials and composites, 2005, 63, pp. 192-203.
Carll et al., "Review of thickness swell in hardboard siding", 1997, Forest products laboratory, general technical report FPL-GTR-96.
Rofael et al., "Hydrophobizing of particleboard with paraffins Part 4", Adhesion, 28, 17-21, (1984).
Hsu et al., "The effect of wax type and content on waferboard properties", International Particleboard/composite materials symposium, 1990, 85-93.
PA42, Fifth edition, vol. 1, Chapter 10: Wood products industry, http://www.epa.gov/ttnchie/1/ap42/ch10/final/c10s06-2.pdf, (2002).

* cited by examiner

WAX COATING AND ASSOCIATED METHODS OF USE

CROSS-REFERENCE TO RELATED APPLICATIONS

This application claims the benefit of provisional U.S. Ser. No. 62/101,580, filed Jan. 9, 2015, the entire contents of which are expressly incorporated by reference herein.

FIELD

Systems and methods are provided for forming a wax coating composition, e.g., for use with composite cellulosic materials, e.g., composite board materials, such as particleboard and medium density fiberboard (MDF).

BACKGROUND

The use of wax to provide water repellency in composite board products such as, e.g., particleboard, medium density fiberboard (MDF), and construction boards, etc. is a fast growing application of wax because of growth in the composite board industry. Wax is added to these manufactured wood products to provide adequate water repellency because such cellulose based wood products easily wick in moisture, which can lead to poor dimensional stability of these products. Therefore, wax coating compositions on cellulosic products provide barrier to moisture, water, oil and grease that ultimately protects the mechanical integrity of the material.

Previous studies on optimum wax compositions for water proofing of composite boards and, specifically, particleboards and MDF boards points to n-paraffin content of waxes as the main compositional parameter affecting water repellency. However, the art is rife with conflicting information regarding the effect of wax compositional variables on their waterproofing performance in composite boards.

It is well-known in the art that a narrow molecular weight distribution of paraffin molecules is beneficial for several key properties, including, inter alia, improved water-proofing, hardness, and oil bleed, among others. For example, wax with a wide carbon number distribution is known to be detrimental to the quality of the wax and causes "oil bleed" (Young, F. X. "Practical Applications of Gas Chromatography in Paints and Coatings Industry," Analysis of Paints and Related Materials: Current Techniques for Solving Coating Problems, American Society for Testing and Materials (ASTM), Philadelphia, 1992, ASTM STP 1119, p 105-124). Oil bleed is the tendency of a wax to have a slick-oily surface and is related to poor wax quality and poor water proofing. Oil bleed in a coating product may provide poor surface characteristics to the coating in terms of poor appearance and lower friction coefficient of the slick coated surface. Similarly, a narrow distribution of carbon lengths and a narrow distillation cut is necessary for production of a high quality wax having sufficient hardness, especially at higher temperatures (Meyer, G. "Interactions between chain length distributions, crystallization behavior and needle penetration of paraffin waxes," Erdol-Erdgas-Kohle Journal, 2006, 122.Jb, 1, S. 16-18). Finally, the literature has described how increasing molecular weight distribution leads to a decrease in crystal perfection of crystalline materials, which in turn is directly responsible for reduction in barrier properties and water proofing of the material.

For the same reasons, high n-paraffin content is desired in waxes that are used in water proofing applications. High n-paraffin content tends to give a higher percentage of crystalline phase in the material, which in turn is responsible for good barrier properties of the material among other desirable characteristics.

Competing with the ongoing need for paraffin wax materials, including those suitable for use in coating cellulosic materials and composite boards, is the fact that the wax obtained from the Group I refining process, which includes high-quality paraffin waxes, are declining (especially the mid and low carbon numbers), because these wax stocks are more and more frequently consumed for the production of lubricants. Moreover, lower quality paraffin waxes are also recycled and further processed for further lubricant production. In addition, rationalization of Group I refining assets is also reducing the supply of wax. With a reduction in available sources of wax, it has become ever more important to have the flexibility of blending different wax streams without a concomitant deterioration in product properties. However, blending of wax streams with widely different molecular weights or widely different average carbon numbers is well-known to have a negative effect on product properties.

As such, there exists in the art a need for the wax materials that demonstrate properties suitable for industrial use, e.g., coatings for cellulosic materials, candles, writing implements, etc. but that can be produced with lower cost waxes and the flexibility to formulate an optimized wax product for use as a composite board coating with a variety of available wax streams. With the rationalization of Group 1 refining capacity around the world and sharply declining availability of high quality wax streams, a flexibility to use different wax streams to make a suitable product provides a significant advantage.

SUMMARY

Presently described are wax compositions and methods for making and using the same to improve the characteristics of cellulosic materials, e.g., composite board materials and in specific, particleboard and medium density fiberboard. Suitable blends of waxes or individual wax streams that are individually not suitable or not optimized for composite wood coatings can be identified using the optimum wax composition envelope discovered in this disclosure, thereby allowing for use of such wax streams in the application and increasing the value of scantily available wax molecules. It was surprisingly and unexpectedly discovered that optimized wax compositions suitable for use in these applications depend simultaneously on both the n-paraffin content and carbon number distribution. It was observed that the waxes demonstrate less dependence on the average carbon number of the wax, and the oil in wax content of the wax.

In particular, the description provides paraffin wax compositions useful to make coatings for composite cellulosic materials or wood, e.g., particleboard, medium density fiberboard, construction board, etc., which have improved water proofing characteristics. Specifically, the description provides a unique set of wax compositional parameter specifications that surprisingly provide improved properties for use of the wax blend composition in coatings for composite cellulosic materials or wood, e.g., particleboard, medium density fiberboard.

Thus, in one aspect, the disclosure provides wax compositions. In certain embodiments, the wax composition comprises a total n-paraffin content (% npar) of from about 30% wt to about 95% wt. In additional embodiments, the wax composition comprises a total n-paraffin content of from about 37% wt to about 65% wt. In additional embodiments, the wax composition comprises a total n-paraffin content of from about 40% wt to about 55% wt. In additional embodiments, the wax composition comprises a total n-paraffin content of about 50% wt.

In additional embodiments, the wax composition comprises paraffins having a 95% carbon number spread (95% spread) of from about 1 to about 23 carbon atoms. In certain additional embodiments, the wax composition comprises paraffins having a 95% carbon number spread of from about 11 to about 22 carbon atoms. In certain additional embodiments, the wax composition comprises paraffins having a 95% carbon number spread of from about 13 to about 17 carbon atoms. In certain additional embodiments, the wax composition comprises paraffins having a 95% carbon number spread of from about 14 to about 15 carbon atoms.

In certain embodiments, the wax composition comprises a total n-paraffin content of from about 30% wt to about 95% wt and a 95% carbon number spread of from about 1 to about 23 carbon atoms. In certain embodiments, the wax composition comprises a total n-paraffin content of from about 37% wt to about 65% wt and a 95% carbon number spread of from about 11 to about 22 carbon atoms. In certain embodiments, the wax composition comprises a total n-paraffin content of from about 40% wt to about 55% wt and a 95% carbon number spread of from about 13 to about 17 carbon atoms. In certain embodiments, the wax composition comprises a total n-paraffin content of from about 50% wt and a 95% carbon number spread of from about 14 to about 15 carbon atoms.

In any of the aspects or embodiments described herein, the resulting wax composition provides a low (particleboard) water absorption in a 24 hr water soak test, of less than about 45.50%.

In any of the aspects or embodiments described herein, the resulting wax composition satisfies the following expressions:

$$(\% \text{ npar}) > -125 + 7.25 * 95\% \text{ C\#spread} \quad (\text{Eq 4});$$

$$(\% \text{ npar}) < 79.97 - 1.62 * (95\% \text{ C\#spread}) \quad (\text{Eq 1});$$

$$(\% \text{ npar}) > 67.57 - 1.62 * (95\% \text{ C\#spread}) \quad (\text{Eq 2})$$

$$\text{and } (\% \text{ n-par}) < 95\%. \quad (\text{Eq 3})$$

In certain embodiments, the wax composition as described herein satisfies the following expression:

$$\% \text{ npar} = 73.37 - 1.62 * (95\% \text{ spread}) \quad (\text{Eq 6}).$$

In any of the aspects or embodiments described herein, the n-paraffins comprising the wax composition as described herein have an average carbon number of from 25 to 40. In certain embodiments the average carbon number ranges from 27-38. In still additional embodiments, the average carbon number ranges from 27-28.

In any of the aspects or embodiments described herein, the % oil-in-wax content of the paraffin wax composition as described herein can range from 0-40% wt of the wax. In certain embodiments, the % oil-in-wax content of the paraffin wax composition as described herein can range from 4-30% wt of the wax.

In an additional aspect, the disclosure provides a cellulosic material coated with a wax composition as described herein. In certain embodiments, the cellulosic material is completely saturated or coated with the wax composition. In additional embodiments, the cellulosic material is partially coated. In certain embodiments, the description provides a wax coated cellulosic material or article comprising a cellulosic surface comprising a wax coating of from about 0.1% by weight to about 45% by weight of the cellulosic material or article.

In another aspect, the disclosure provides a composite cellulosic material or wood, e.g., particleboard, medium density fiberboard, construction board or the like having a complete or partial wax coating formed from the wax compositions as described herein, wherein the resulting coated composite cellulose material or wood has a water absorption of less than 45.5%. In certain embodiments, the resulting coated composite cellulosic material or wood has a water absorption of less than 43.5%, or less than 38.5%, including all values in between. In certain embodiments, the description provides a wax coated cellulosic article comprising a wax coating of from about 0.1% by weight to about 90% by weight of the cellulosic article.

In an additional aspect, the disclosure provides items formed from the wax compositions as described herein. In certain embodiments, the wax items include a candle or a crayon.

In an additional aspect, the disclosure provides methods of making the wax compositions as described herein. In certain embodiments, the method includes admixing two or more paraffin waxes having a total n-paraffin content of at least 20% wt, wherein each respective wax has a 95% carbon number spread of from at least 1 carbon atom to about 23 carbon atoms, with same or different average carbon numbers and/or oil in wax contents. In certain embodiments, the method includes admixing a baseoil and/or F-T wax with two or more paraffin waxes having a total n-paraffin content of at least 20% wt, wherein each has a 95% carbon number spread of at least 1 carbon atom to about 23 carbon atoms, with same or different average carbon numbers and/or oil in wax contents. In certain embodiments, the method includes admixing two or more paraffin waxes each having a total n-paraffin content of from about 37% wt to about 57% wt, wherein each has a 95% carbon number spread of from 15 to about 21 carbon atoms.

In still an additional aspect, the disclosure provides methods of using the wax compositions as described herein. In certain embodiments, the disclosure provides a method of forming a wax-coated article or material comprising providing the item and applying a coating of the wax composition as described herein. In certain embodiments, the disclosure provides a method of forming a wax-coated cellulosic composite material comprising providing a cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In certain embodiments the wax is absorbed into the cellulosic material. In certain embodiments, the neat molten wax is sprayed on the cellulosic material to form a partial coating. In certain embodiments, the wax can be emulsified together with water and surfactants in various concentrations and the emulsion can be sprayed or added directly into slurry prior to board formation. In any of the embodiments described herein, the cellulosic material is a composite cellulosic material or wood, e.g., particleboard, medium density fiberboard, construction board or the like.

Where applicable or not specifically disclaimed, any one of the embodiments described herein are contemplated to be able to combine with any other one or more embodiments, even though the embodiments are described under different aspects of the disclosure.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure. The publications and other materials used herein to illuminate the background of the disclosure, and in particular cases, to provide additional details respecting the practice, are incorporated by reference, and for convenience are listed in the appended bibliography.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which.

DETAILED DESCRIPTION

Presently described are wax compositions and methods for making and using the same to improve the characteristics of cellulosic materials, e.g., composite cellulosic materials, such as composite board materials. It was surprisingly and unexpectedly discovered that optimized wax compositions suitable for use in these applications depend simultaneously on both the n-paraffin content and carbon number distribution but very weakly on average carbon number of the wax, and the oil in wax content of the wax. As such, the description provides paraffin wax compositions useful for coating of composite cellulosic materials or wood, e.g., particleboard, medium density fiberboard, construction board, etc., which have improved water proofing characteristics. Moreover, the description provides a unique set of wax compositional parameter specifications that surprisingly provide improved properties for use of the wax blend composition in coatings for composite cellulosic materials or wood, e.g., particleboard, medium density fiberboard, construction board etc.

Conventional wisdom in the art is that a high n-paraffin content is beneficial or required for improved water proofing characteristics of the wax in particleboards and medium density fiberboards, as described herein, it was surprisingly and unexpectedly discovered that the total amount of n-paraffin demonstrates second-order nonlinear effect or biphasic effect on water proofing, such that at constant value of 95% carbon # spread, the water repellency improves with increasing n-paraffin content until it reaches an optimum, above which, the water repellency is surprisingly seen to diminish with increasing n-paraffin content of the wax.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about" or "approximately" means an acceptable error for a particular value as determined by one of ordinary skill in the art, which depends in part on how the value is measured or determined. All numerical values within the detailed description and the claims herein are modified by "about" or "approximately" the indicated value, and take into account experimental error and variations that would be expected by a person having ordinary skill in the art.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Wax Compositions

Described herein are paraffin wax compositions, including wax blends, suitable for a number of uses and applications, including, for example, for making a coating for composite cellulosic materials that provide improved water repellency characteristics. Specifically, the present description provides a unique set of wax compositional parameter specifications that surprisingly provide improved properties for use of the wax blend composition for coating composite cellulosic materials or wood, e.g., particleboard, medium density fiberboard, etc.

Paraffin wax is a white or colorless soft solid derivable from petroleum, coal or oil shale by distillation. The feedstock for paraffin is slack wax, which is a mixture of oil and wax, a byproduct from the refining of lubricating oil. The first step in making paraffin wax is to remove the oil (de-oiling or de-waxing) from the slack wax. The oil is generally separated through crystallization. Most commonly, the slack wax is heated, mixed with one or more solvents such as a ketone and then cooled. As it is cooled, wax crystallizes out leaving oil in solution. This mixture is filtered into two streams: solid (wax plus some solvent) and liquid (oil and solvent). After the solvent is recovered by distillation, the desired carbon cuts are obtained. The resulting products are called "hard wax" and "foots oil". The lower the percentage of oil in the wax the more refined it is considered (semi-refined versus fully refined). The product wax may be further processed to remove colors and odors.

Paraffins (general formula $C_nH_{2n+2}$; wherein n=1 through 400) are a mixture of hydrocarbons containing from about 10 to about 100 carbon atoms per molecule. Paraffin waxes can be composed of either straight chains (i.e., normal or n-paraffins), branched chains (i.e., isoparaffins) or cyclic paraffins. Most of the molecules in paraffin wax derived from naturally occurring crude oils are normal paraffins and isoparaffins. Paraffin wax is solid at room temperature and begins to melt above approximately 37° C. (99° F.); its boiling point is >370° C. (698° F.).

Lower molecular weight paraffins have a lower boiling point, while higher molecular weight paraffins have a higher boiling point. Therefore, separation of paraffins by the carbon number is possible through distillation. However, higher carbon number fractions or cuts typically have a higher 95% carbon number spread (i.e., there is a wider distribution in the carbon number in the higher molecular weight or higher carbon number fractions). The 95% carbon number spread is a measure of the distribution in the carbon number of paraffins in the wax around the average carbon number. For example, low molecular weight paraffins, e.g., C27 or C28 typically have a 95% carbon number spread of approximately 12.3; whereas, high molecular weight paraffin, e.g., C38, typically has a 95% carbon number spread of approximately 22.5.

Common applications for paraffin wax compositions, including the paraffin wax compositions described herein, include lubrication, electrical insulation, sealants, food additives and coatings, candles, wax crayons, and saturating wax coatings of cellulosic materials. Anti-caking agent, moisture repellent, and dustbinding coatings for fertilizers; agent for preparation of specimens for histology; bullet lubricant—with other ingredients, such as olive oil and beeswax; phlegmatizing agent, commonly used to stabilize/desensitize high explosives such as RDX; solid propellant for hybrid rocket motors; component of surfwax or glidewax; friction-reducer, for use on handrails and cement ledges; ink; glazing agent; forensic tests; antiozonant agents: a release agent, helping the product separate from its mold; mechanical thermostats and actuators, as an expansion medium for activating such devices; wax baths for beauty and therapy purposes; thickening agent in paintballs; moisturiser in toiletries and cosmetics; protectant from metal oxidation; phase change material for thermal energy storage; among others.

Coating compositions to provide a moisture as well as oil and grease barrier are commonly used on composite cellulosic and wood materials. With a reduction in available sources of wax, it has become ever more important to have the flexibility of blending different wax streams without deterioration in product properties.

Use of wax to provide water repellency in composite board products such as particleboard, medium density fiberboard and construction boards etc. is a fast growing application of wax because of growth in the composite board industry. Wax is added to these manufactured wood products to provide adequate water repellency, since such cellulose based wood products easily wick in moisture which can lead to poor dimensional stability of these products. Previous studies on optimum wax compositions for water proofing of composite boards and specifically particleboards and MDF boards points to n-paraffin content of waxes as the main compositional parameter affecting water repellency. However, conflicting information is available on the effect of wax compositional variables on their waterproofing performance in composite boards.

Composite board wood products such as particleboard, medium density fiberboard and construction boards etc. have been made for several years and their methods of manufacturing are well-known in the industry. Typically, such wood products are made of cellulosic fibrous materials on which a minor amount of adhesive resin and wax is applied and then this combination is pressed together under high heat and pressure to make the ensuing manufactured wood product in the form of thin stiff sheets as desired. Wax is added to these manufactured wood products to provide adequate water repellency, since such cellulose based wood products easily wick in moisture which can lead to poor dimensional stability of these products. Hence resin in such cases binds the wood elements together and wax acts as a water repellant. Suitable resins or binders for such application, which can be included with any of the wax compositions as described herein, may include multifunctional isocyanates, diisocyanates, polymer dimethylene diisocyanates, urethanes such as phenol formaldehyde resin, urea formaldehyde resin, melamine formaldehyde resin, melamine urea formaldehyde resin, phenol urea formaldehyde resin, resorcinol/formaldehyde, phenol/resorcinol/formaldehyde; polyvinylacetate, polyvinyl alcohol; epoxies, acrylic resin; polysaccharides, such as starch, dextrin, hydroxyethyl cellulose, methyl cellulose, alginates and chitosan; and proteins, such as casein, soybased glue, blood glue, hide glue and bone glue.

The waxes used in the composite board industry are typically comparatively lower value slack waxes with a high oil content. While not so commonly described in literature, the slack waxes used for manufacturing of oriented strand boards are typically a high viscosity grade wax and the slack waxes used in particleboard and MDF applications are typically low viscosity grade waxes. The viscosity typically is given as a SUS viscosity grade or Neutral member, e.g., 100N, 600N; a 100N grade having a lower viscosity and a 600N grade having a higher viscosity.

As described in Hudson et al. (U.S. Pat. No. 6,830,614), typically lower viscosity grade slack waxes have higher % n-paraffin content in the wax (see, e.g., Table 1). It is well-known in the art that the % n-paraffin content of waxes or the % of straight chain linear alkanes in the wax versus branched or cyclical alkanes, plays a major role in hydrophobizing efficacy of the wax (Hsu et al., "Water repellant efficacy of wax used in hardboard." *Ind. Eng. Chem. Res.,* 1988, 27, 1296-1300; Roffael et. al., "Paraffin sizing of particleboards: chemical aspect." In. Maloney, Thomas M., ed. Proceedings, 17th international particleboard/composite materials symposium, 1983; and "For waterproofing medium density fiberboard with paraffins Part 1: influence of the chemical composition of the paraffin and the type of emulsifier on the waterproofing of MDF", *Wood as raw materials and composites,* 2005, 63, 192-203; Hudson et. al.; and Carll et al. "Review of thickness swell in hardboard siding", 1997, Forest products laboratory, general technical report FPL-GTR-96). Higher n-paraffin content in a wax is thought to provide improved water proofing performance. Hence, in general the use of lower viscosity grade slack waxes should be preferred in composite board water proofing applications because they naturally tend to have a higher content of n-paraffins.

TABLE 1

Comparison of Wax Viscosity and n-Paraffin Content.

| Grade (SUS) | % n-paraffins |
|---|---|
| 100-300 | 45-65 |
| 300-500 | 35-50 |
| 500-650 | 10-35 |
| 650-850 | 5-20 |
| 850+ | 0-10 |

However, as described by Hudson et al., in the case of oriented strand board (OSB) application, heavy viscosity grade waxes (typically 550 N and above) are preferred to minimize volatility in wood presses that typically operate at over 400° F. versus particleboard and MDF boards which typically operate below 360° F. The use of a lower operating press temperature in particleboard and MDF, thereby allows for use of more volatile, lower viscosity grade slack waxes that have improved water proofing properties in particleboard and MDF applications due to presence of higher amount of n-paraffins, as opposed to a limiting water proofing performance at 21% n-paraffin content as described by Hudson et al. for oriented strand board construction boards.

However, ambiguous and frequently conflicting data exists in the literature regarding the effect of wax compositional parameters on waterproofing of composite boards. For example, in contrast to the observation of Hudson et al. as described above, Roffael et al. ("For waterproofing medium density fiberboard with paraffins Part 1: influence of the chemical composition of the paraffin and the type of emulsifier on the waterproofing of MDF", Wood as raw materials and composites, 2005, 63, 192-203; and "Hydrophobizing of particleboard with paraffins Part 4", Adhesion, 28,17-21) has described that hydrophobizing effect of paraffins on particleboard/MDF substrate increases with an increase in the chain length of the paraffin between C20 and C36 (higher chain length wax correspondingly has higher viscosity). It is to be noted however, that this observation was made using pure n-alkanes and not a "practical wax," which typically is a wide mixture of n-alkanes of a variety of chain lengths as well as branched and cyclical alkanes with a broad chain length distribution. In another example, in the same study, three practical waxes A, B and C were studied, with Wax A having an oil content of 10-15% and n-alkanes of 35.9% which ranged from C19-C50, Wax B having a reported oil content of 0-22% and n-alkanes of 44.3% ranging from C18-C46 and Wax C having an oil content in the range 12-18 and n-alkanes of 52.7% ranging from C18-43. It was seen in this example that the Wax A and Wax C had equivalent hydrophobizing performance much better than Wax B, even though Wax A, B and C had progressively higher n-paraffin content. Thus, a good understanding of wax compositional parameters on waterproofing performance was not developed.

In work done by Hsu and Bender ("Water repellant efficacy of wax used in hardboard", Ind. Eng. Chem. Res., 1988, 27, 1296-1300) several Waxes labelled A through F with different oil content, n-paraffin content, molecular weights and molecular weight distributions were measured for water repellency on hardboards. The authors described that Wax A, with the highest molecular weight, had the greatest water repellency. However Wax B, with the lowest molecular weight, also showed equivalently high water repellency suggesting that factors other than molecular weight are important in contributing to water repellency. The authors also pointed out that Wax F, which had a high molecular weight but broad molecular weight distribution, had poor water repellency. Thus, the art teaches away from the present discovery and provides no understanding about the combination of compositional variables that may affect water repellency properties of wax.

Accordingly, the present description addresses the need in the art to be able to unambiguously predict the suitability of wax composition for composite board manufacture, e.g., particleboard and MDF applications, and to be able to adjust the wax composition, if needed, to be suitable for such board manufacture. As described above, rationalization of Group I base stock refining capacity around the globe has led to a declining availability of corresponding wax streams that are derived from these base stocks with the decline especially rapid for light neutral (low viscosity grade) waxes. However, with a reduction in available sources of wax, it has become ever more important to have the flexibility of blending different available wax streams without deterioration in product properties. Similarly, with reduced availability of wax streams, it has become even more important to combine the available wax streams in a manner such that the wax composition obtained is optimum for the application and the performance benefit from the wax is maximized. Maximizing performance benefit from available molecules and optimized wax compositions allows for getting the same benefit with less wax used in the application, thereby not only making the deficient wax molecules available to more customers but also reducing the cost of the wax.

As described herein, it was surprisingly discovered that optimized wax compositions suitable for use in these applications, and specifically composite cellulosic or wood materials, e.g., particleboard, medium density fiberboard, construction board, etc. are dependent simultaneously on the n-paraffin content and carbon number distribution and very weakly on average carbon number of the wax and oil-in-wax content. However, the present description also relates to the efficacy of lower value higher oil content scale and slack waxes (i.e., those having an oil-in-wax content >3.5%), which may generally be considered to be unsuitable for waterproofing application due to their higher oil content. The average carbon number here is defined as the average carbon chain length in the mixture of all the carbon chain lengths in the wax and the 95% carbon number spread is the average number of carbon variation in the distribution of paraffins. As used herein, 95% carbon number spread is defined as standard deviation of the total distribution*1.96*2.

The description provides a non-intuitive envelope or group of wax compositions that can be used to provide improved water repellency properties in cellulosic or wood materials, e.g., composite boards, such as particleboards, MDF boards, construction and oriented strand boards. The following equations provide the bounds for wax compositional parameters that provide optimum water proofing in composite boards, e.g., particleboards and MDFs.

$$(\% \text{ npar}) < 79.97 - 1.62*(95\% \text{ C\#spread}) \quad (Eq\ 1),$$

$$(\% \text{ npar}) > 67.57 - 1.62*(95\% \text{ C\#spread}) \quad (Eq\ 2),$$

$$\text{with } (\% \text{ npar}) < 95\%, \quad (Eq\ 3),$$

$$\text{and } (\% \text{ npar}) > -125 + 7.25*95\% \text{ C\#spread} \quad (Eq\ 4),$$

These 4 equations together represent by the shaded area in FIG. 1. As would be understood by those of skill in the art, the present description encompasses waxes falling within the boundaries of the shaded area of FIG. 1. Obviously, waxes that lie closer to the "Globally Optimum" are preferred and expressly encompassed by the present description.

The regression model that describes the data is added below (Eq 5).

$$\% \text{ WA} = 0.85 + 0.62*(95\% \text{ spread}) + 0.369*(\% \text{ npar}) + 0.285*(95\% \text{ spread} - 14.13)*(\% \text{ npar} - 52.59) + 0.088*(\% \text{ npar} - 52.59)^2 \quad (Eq\ 5)$$

*74% $R^2$ fit of predicted model to the data with constant average carbon number (data points 1 through 16). Wax 10 data point was excluded as an outlier from modeling. Wax samples with varying average carbon numbers were also made (samples 17 through 21) and are plotted in FIG. 1.

It was also seen that oil in wax has no effect on the water proofing performance of the wax in particleboards, for OIW concentrations even as high as 35%, which is similar to observations made in past studies (Hudson et. al.[1], Hsu et. al.[2], Hsu et. al.[3], Lindsay et. al.[17]).

To compute the wax compositions that provide optimum/best water proofing characteristics, partial derivatives of the above expression (Eq 5) were taken with respect to variables % npar and 95% spread and the partial derivatives were put to zero, which provides the following two equations to determine optimum performance:

$$\frac{\partial(\% \ WA)}{\partial(\% \ npar - 52.59)} = \quad \text{(Eq 6)}$$
$$0.37 + 0.285*(95\% \ \text{spread} - 14.13) + 0.176*(\% \ npar - 52.29) = 0 \ \text{or,}$$
$$\% \ npar = 73.37 - 1.62*(95\% \ \text{spread}); \text{ and}$$

$$\frac{\partial(\% \ WA)}{\partial(95\% \ \text{spread} - 14.13)} = \quad \text{(Eq 7)}$$
$$0.62 + 0.285*(\% \ npar - 52.59) = 0 \ \text{or,}$$
$$\% \ npar = 50.41$$

Hence Eq 6 provides the equation of a line, which describes the optimum compositions that provide the best water repellency wax. For example, at any fixed n-paraffin content, the 95% spread that can provide the optimum water proofing properties can be computed from Eq 6 by plugging in the value of n-paraffin content.

By simultaneously solving Eq 6 and 7, the global optimum composition at which the best waterproofing performance of light viscosity grade waxes can be seen is found at % npar=50.4 and 95% spread=14.2. It may however not always be practically possible to achieve wax compositions that fall on the optimum line and hence an optimum composition window enclosing the optimum composition line can be drawn to incorporate possible wax compositions that provide superior water barrier performance in particleboard and MDF applications (See FIG. 1, gray box). This also accounts for possible errors in measurement of compositions as well as water repellency data. Such a window is obtained by drawing two parallel lines on either side of the optimum line (Eq 6), the equations for which are given by Eq 1 and Eq 2, at the estimated boundary of what is considered acceptable product water repellency performance versus what is not acceptable.

This is surprising and non-intuitive since the past literature has frequently described only the effect of the % n-paraffin or % oil-in-wax (% OIW) content as primary to the water proofing characteristics of the wax and higher n-paraffin content wax is described a better water repellant material while no reference to the combined effect of different compositional variables on the performance of the wax has been made or understood.

Even more surprisingly, it is seen that water absorption has a non-linear, second order dependency on the % n-paraffin content of the wax. Hence, at a fixed typical 95% carbon number spread of the wax of 14.6, a wax containing ~50% n-paraffin content is predicted to provide optimum water repellency. Hence, as expected, at this fixed 95% carbon # spread, the water repellency improves with increasing n-paraffin content till it reaches an optimum at 50% n-paraffin content, above which, the water repellency is surprisingly seen to diminish with increasing n-paraffin content of the wax. This is counterintuitive to the argument and general belief in the industry that higher n-paraffins always progressively provide better water repellency. Another surprising observation from the data is that for waxes with a wider distribution of carbon numbers, the n-paraffin content required for optimum performance at that 95% carbon spread is lower than that required for a wax with a narrow carbon number spread. Hence, lower quality slack waxes that have a higher carbon number distribution but lower n-paraffin content can also be optimized to fall within the optimum window of compositions through blending and made suitable for use in this application. Also, blends of low n-paraffin content waxes, that are typically not used in particleboard applications, can be combined in a way such that the wax blend has a wide 95% carbon number spread and thus made suitable for the particleboard application, if they fall within the optimum envelope of wax compositions (e.g. combination of 100N slack wax and 600N slack wax).

Thus, the description provides a system for identifying and combining available low value wax streams that individually are not suitable or not optimized for waterproofing of coating composite cellulosic or wood materials in a way to make optimum wax compositions for use in composite cellulosic materials, e.g., composite board coatings, thereby allowing for use of such wax streams in the application and increasing the value of scantily available wax molecules.

Thus, in one aspect, the disclosure provides wax compositions. In certain embodiments, the wax composition comprises a total n-paraffin content (% npar) of from about 30% wt to about 95% wt. In additional embodiments, the wax composition comprises a total n-paraffin content of from about 37% wt to about 65% wt. In additional embodiments, the wax composition comprises a total n-paraffin content of from about 40% wt to about 55% wt. In additional embodiments, the wax composition comprises a total n-paraffin content of about 50% wt.

In additional embodiments, the wax composition comprises paraffins having a 95% carbon number spread (95% spread) of from about 1 to about 23 carbon atoms. In certain additional embodiments, the wax composition comprises paraffins having a 95% carbon number spread of from about 11 to about 22 carbon atoms. In certain additional embodiments, the wax composition comprises paraffins having a 95% carbon number spread of from about 13 to about 17 carbon atoms. In certain additional embodiments, the wax composition comprises paraffins having a 95% carbon number spread of from about 14 to about 15 carbon atoms.

In certain embodiments, the wax composition comprises a total n-paraffin content of from about 30% wt to about 95% wt and a 95% carbon number spread of from about 1 to about 23 carbon atoms. In certain embodiments, the wax composition comprises a total n-paraffin content of from about 37% wt to about 65% wt and a 95% carbon number spread of from about 11 to about 22 carbon atoms. In certain embodiments, the wax composition comprises a total n-paraffin content of from about 40% wt to about 55% wt and a 95% carbon number spread of from about 13 to about 17 carbon atoms. In certain embodiments, the wax composition comprises a total n-paraffin content of from about 50% wt and a 95% carbon number spread of from about 14 to about 15 carbon atoms.

In any of the aspects or embodiments described herein, the resulting wax composition provides a low (particleboard) water absorption in a 24 hr water soak test, of less than about 45.50%. The water absorption is measured as the % increase in weight of the particleboard in a 24 hr water soak of the board according to the ANSI A208.1-2009 Particleboard (modified—samples were not preconditioned to 65% RH @ 20 C) method.

In any of the aspects or embodiments described herein, the resulting wax composition satisfies the following expressions:

$$(\% \ npar) > -125 + 7.25 * 95\% \ C\#\text{spread} \quad \text{(Eq 4)};$$

$$(\% \ npar) < 79.97 - 1.62 * (95\% \ C\#\text{spread}) \quad \text{(Eq 1)};$$

$$(\% \ npar) > 67.57 - 1.62 * (95\% \ C\#\text{spread}) \quad \text{(Eq 2)}$$

$$\text{and } (\% \ \text{n-par}) < 95\%. \quad \text{(Eq 3)}$$

In certain embodiments, the wax composition as described herein satisfies the following expression:

$$\% \text{ npar} = 73.37 - 1.62 * (95\% \text{ spread}) \quad \text{(Eq 6)}.$$

In any of the aspects or embodiments described herein, the n-paraffins comprising the wax composition as described herein have an average carbon number of 25, 26, 27, 28, 29, 30, 31, 32, 33, 34, 35, 36, 37, 38, 39 or 40. In certain embodiments the average carbon number ranges from 27-38. In still additional embodiments, the average carbon number ranges from 27-28.

In any of the aspects or embodiments described herein, the % oil-in-wax content of the paraffin wax composition as described herein can range from 0-40% wt of the wax. In certain embodiments, the % oil-in-wax content of the paraffin wax composition as described herein can range from 4-30% wt of the wax.

In any of the aspects or embodiments described herein, the paraffins are n-paraffins.

In any of the aspects or embodiments described herein, the 95% carbon number spread may be selected from the group consisting of 95% carbon number spread of 1, 2, 3, 4, 5, 6, 7, 8, 9, 10, 11, 12, 13, 14, 15, 16, 17, 18, 19, 20, 21, 22, or 23 carbon atoms, and combinations thereof.

The discovery as described herein provides flexibility for wax refiners to allow for blending available wax streams, and to formulate an optimized wax product in a way that they may be made suitable for use as a composite board coating. With the rationalization of group 1 refining capacity around the world and sharply declining availability of high quality wax streams, a flexibility to use different wax streams to make a suitable product provides a significant advantage and is essential for the sustainability of the wax business.

In an additional aspect, the description provides a wax composition comprising at least two component waxes having different 95% carbon number spread distributions independently selected from the range of about C1 to about C23, including 95% carbon number spread of 1, 2, 3, 4, 5, 6, 7, 8, 9, 10, 11, 12, 13, 14, 15, 16, 17, 18, 19, 20, 21, 22, or 23 carbon atoms, and combinations thereof, wherein each respective component has an n-paraffin content of from about 30% to about 60% (95%). In certain embodiments, the respective component waxes comprise an n-paraffin content of approximately 30%, 40%, 50%, 60% (95%) n-paraffin, including all values in between.

In certain embodiments, the resulting wax composition provides a low (particleboard) water absorption in a 24 hr water soak test, typically less than about 45.50%. The water absorption is measured as the % increase in weight of the particleboard in a 24 hr water soak of the board according to the ANSI A208.1-2009 Particleboard (modified—samples were not preconditioned to 65% RH @ 20 C) method. In certain embodiments, at least a portion of the paraffins in the paraffin wax composition is modified, e.g., by adding branching to the existing carbon backbone chain to modify the crystal properties of the paraffin wax. The modification is usually done with additives, such as EVA copolymers, microcrystalline wax, or forms of polyethylene. The branched properties result in a modified paraffin with a higher viscosity, less crystalline structure, and modified functional properties.

For example, methods to improve performance of wax or other waterproofing additives in composite boards, hardboards or other cellulosic coating applications have focused on use of extenders or additives in wax (Briner et. al.[9], Buchholz et. al.[10]) or use of nanoparticulate wax emulsions (Buchholz et. al.[11]) for improved emulsion performance. Other references have talked about use of high contents of linear olefins or linear alkanes (n-alkanes) or a combination of both, typically above 50% to obtain acceptable waterproofing performance, similar to past literature describing improved water proofing being directly related to amount of linear n-paraffins or n-alkanes molecules in the wax. Examples of such are Buchholz et. al.[12], which describes use of a combination of olefins and paraffin wax, wherein the olefins contain at least 50 mol % linear alpha-olefins and paraffin wax contains at least 60% linear n-alkanes. Another example by Winterowd et. al.[13] talks about use of wax with 70-93% n-alkanes in the wax.

In another aspect, the description provides composition comprising a wax composition as described herein, and a cellulosic binder or resin, e.g., cross-linker, suitable for binding composite board materials. Such binders include, e.g., acrylates, latex, polyurethanes, or other binders known in the art. In an exemplary method, coating compositions can be prepared accordingly to the steps of combining and dispersing a resin or cellulosic binder in a molten wax as described herein, and stirring at high speeds. Suitable resins or binders for such application may include multifunctional isocyanates, diisocyanates, polymer dimethylene diisocyanantes, urethanes such as phenol formaldehyde resin, urea formadehyde resin, melamine formaldehyde resin, melamine urea formaldehyde resin, phenol urea formaldehyde resin, resorcinol/formaldehyde, phenol/resorcinol/formaldehyde; polyvinylacetate, polyvinyl alcohol; epoxies, acrylic resin; polysaccharides, such as asstarch, dextrin, hydroxyethyl cellulose, methyl cellulose, alginates and chitosan; and proteins, such as casein, soybased glue, blood glue, hide glue and bone glue.

Coating Methods/Articles

In still an additional aspect, the disclosure provides methods of using the wax compositions as described herein. In certain embodiments, the disclosure provides a method of forming a wax-coated article or material comprising providing the item and applying a coating of the wax composition as described herein.

In certain embodiments, the disclosure provides a method of forming a wax-coated cellulosic composite material comprising providing a composite cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In any of the embodiments described herein, the cellulosic material is a composite cellulosic material or wood, e.g., particleboard, medium density fiberboard, construction board or the like.

The composite boards described here can be made by combining natural fibrous materials, resin and wax under high heat and pressure to form the composite board. The wax in these applications can be applied either as neat molten wax or as a wax in water emulsion. The neat molten wax is generally sprayed on the cellulosic material while the wax in water emulsion can be sprayed or added directly into slurry prior to board formation.

When attempting to apply the wax composition to a surface of a cellulosic material, increased viscosity can create difficulties in creating a coating that is both thin and sufficiently continuous to provide improved water resistance to the underlying material. At higher viscosities, the coating thickness required to maintain a substantially continuous coating is greater, thus requiring an increased amount of the wax to coat a given surface. Higher viscosities can also require higher processing temperatures during application of the wax.

The disclosure provides methods of using the wax compositions as described herein. In certain embodiments, the disclosure provides a method of forming a wax-coated article or material comprising providing the item and applying a coating of the wax composition as described herein. In certain embodiments, the disclosure provides a method of forming a wax-coated cellulosic material comprising providing a cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In any of the embodiments described herein, the cellulosic material is a composite cellulosic material.

In various aspects, wax compositions are provided with improved properties for various applications, such as coating of composite cellulosic materials or wood, e.g., particleboard, medium density fiberboard, construction board, such as oriented strand board, etc. Wax compositions as described herein provide improved performance as wood coating in providing equivalent or better water repellency as compared to the products available in the market are identified, possibly also allowing for use of less wax to provide the same performance for the customer thereby reducing the cost for the customer. Specifically, the description provides a unique set of wax compositional parameter specifications that surprisingly provide improved properties for use of the wax blend composition in coatings for composite cellulosic materials or wood, e.g., particleboard, medium density fiberboard, construction board, such as oriented strand board, etc.

In an additional aspect, the disclosure provides a cellulosic material coated with a wax composition as described herein. In certain embodiments, the cellulosic material is completely saturated or coated with the wax composition. In additional embodiments, the cellulosic material is partially saturated or coated. In certain embodiments, the description provides a wax coated composite cellulosic article comprising a cellulosic surface including from about 0.1% by weight to about 90% by weight of cellulosic material, e.g., the particle board. In certain embodiments, the wax coated cellulosic article is a composite cellulosic material or wood, e.g., particleboard, medium density fiberboard, construction board, such as oriented strand board. In a preferred embodiment, the resulting coated composite cellulose material or wood has a water absorption of typically less than about 45.50%. The water absorption is measured as the % increase in weight of the particleboard in a 24 hr water soak of the board according to the ANSI A208.1-2009 Particleboard (modified—samples were not preconditioned to 65% RH @ 20 C) method. In certain embodiments, the resulting coated composite cellulosic material or wood has a water absorption of less than 43.5%, or less than 38.5%, including all values in between.

In an additional aspect, the disclosure provides items formed from the wax compositions as described herein. In certain embodiments, the wax items include a candle or a crayon.

The wax in the composition can be a mineral wax such as paraffin wax or microwax (microcrystalline wax); vegetable or animal derived bio-wax; synthetic wax such as Fischer-Tropsch wax or polyethylene wax; semi-crystalline waxes; or combinations of two or more waxes and/or two or more types of waxes. In some aspects, the wax can include at least about 50 wt % of a paraffin wax, or at least about 60 wt %, or at least about 70 wt %.

Methods of Manufacture of Wax Compositions

In an additional aspect, the disclosure provides methods of making the wax compositions as described herein. In certain embodiments, the method includes admixing two or more paraffin waxes having a total n-paraffin content of at least 30% wt, wherein each has a 95% carbon number spread of 1, 2, 3, 4, 5, 6, 7, 8, 9, 10, 11, 12, 13, 14, 15, 16, 17, 18, 19, 20, 21, 22, or 23 carbon atoms. In certain embodiments, the wax has an n-paraffin content of about 30% wt, 40% wt, 50% wt, 60% wt, 70% wt, 80% wt, 90% wt or 95% wt.

In certain embodiments, the method includes admixing two or more paraffin waxes each independently having a total n-paraffin content of from about 30% wt to about 65% wt (95%), wherein each has a 95% carbon number spread of from about 9 carbon atoms to about 23 carbon atoms.

In certain embodiments, the resulting wax composition provides a water absorption of typically less than about 45.5%. In certain embodiments, the resulting wax composition provides a water absorption of less than 43.5%, or less than 38.5%, including all values in between.

Figure 1A:
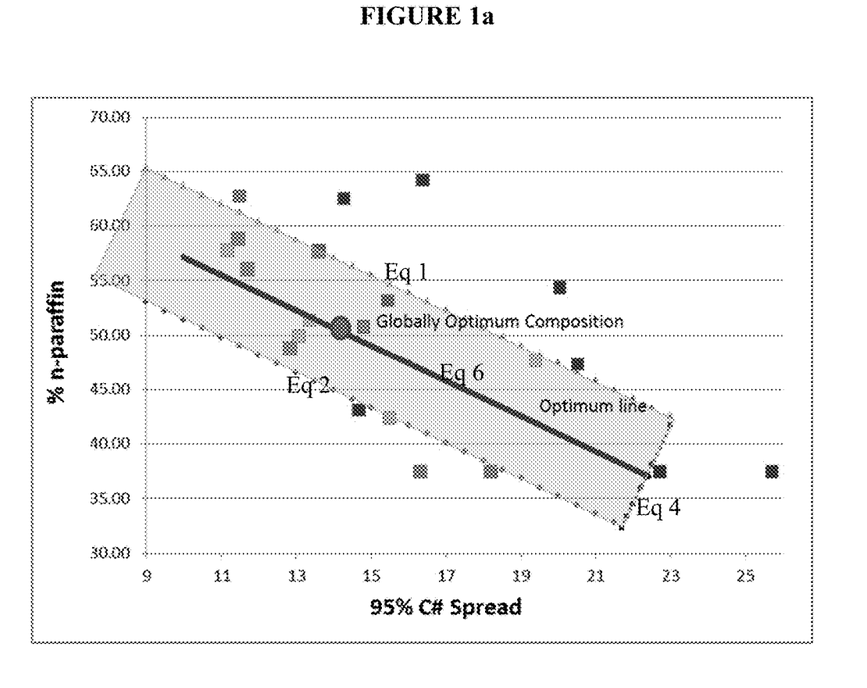
FIG. 1a-c. Plot of % wt n-paraffin versus 95% Carbon number spread for exemplary wax compositions as described herein. The graph shows the compositions within the grey envelope (bound by the equations (Eq) described herein) have improved water repellency properties (green dots) over the compositions outside the envelope (red and orange points).

In any of the aspects or embodiments described herein, the resulting wax composition satisfies (i.e., is within the area defined by) the following expressions (See FIG. 1a):

$$(\% \text{ npar}) > -125 + 7.25 * 95\% \text{ C\#spread} \quad (\text{Eq 4});$$

$$(\% \text{ npar}) < 79.97 - 1.62 * (95\% \text{ C\#spread}) \quad (\text{Eq 1});$$

$$(\% \text{ npar}) > 67.57 - 1.62 * (95\% \text{ C\#spread}) \quad (\text{Eq 2}),$$

$$\text{and } (\% \text{ n-par}) < 95\%. \quad (\text{Eq 3})$$

Figure 1B:
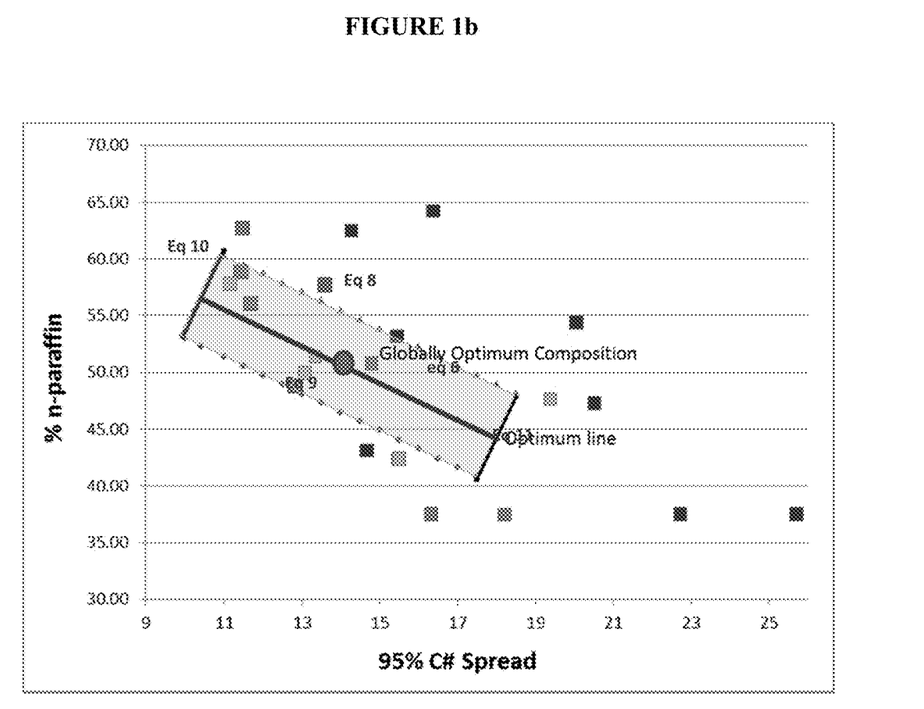

In certain embodiments, the wax composition as described herein satisfies (i.e., is within the area defined by) the following expressions (See FIG. 1b):

$$(\% \text{ npar}) < 78.12 - 1.62 * (95\% \text{ C\#spread}) \quad (\text{Eq 8});$$

$$(\% \text{ npar}) > 69.19 - 1.62 * (95\% \text{ C\#spread}) \quad (\text{Eq 9});$$

$$(\% \text{ npar}) < -19 + 7.25 * 95\% \text{ C\#spread} \quad (\text{Eq 10});$$

$$(\% \text{ npar}) > -86.3 + 7.25 * 95\% \text{ C\#spread} \quad (\text{Eq 11}); \text{ and}$$

$$\% \text{ npar} = 73.37 - 1.62 * (95\% \text{ spread}) \quad (\text{Eq 6}).$$

Figure 1C:
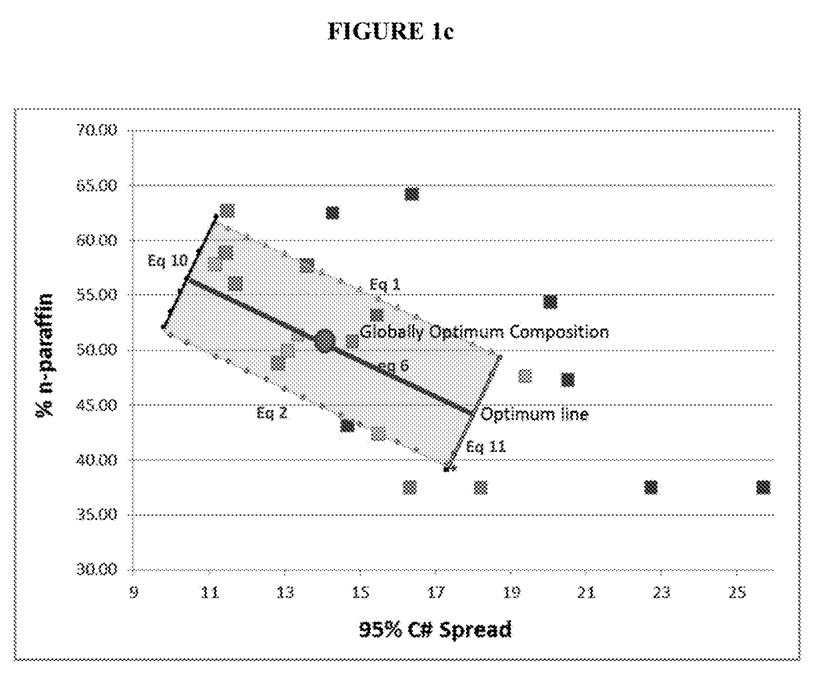

In certain embodiments, the wax composition as described herein satisfies (i.e., is within the area defined by) the following expressions (See FIG. 1c):

$$(\% \text{ npar}) < 79.97 - 1.62 * (95\% \text{ C\#spread}) \quad (\text{Eq 1});$$

$$(\% \text{ npar}) > 67.57 - 1.62 * (95\% \text{ C\#spread}) \quad (\text{Eq 2});$$

$$(\% \text{ npar}) < -19 + 7.25 * 95\% \text{ C\#spread} \quad (\text{Eq 10});$$

$$(\% \text{ npar}) > -86.3 + 7.25 * 95\% \text{ C\#spread} \quad (\text{Eq 11}); \text{ and}$$

$$\% \text{ npar} = 73.37 - 1.62 * (95\% \text{ spread}) \quad (\text{Eq 6}).$$

As would be understood by those of skill in the art, the above equations can be combined in a number of ways to define waxes encompassed by the present description, all of which are expressly contemplated and incorporated herein. For example, in certain embodiments, the wax composition satisfies the expressions of: Eq 6, Eq 4, Eq 8, and Eq 9.

In certain embodiments, the wax composition as described herein satisfies (i.e., is on the line defined by) the following expression:

$$\% \text{ npar}=73.37-1.62*(95\% \text{ spread}) \qquad (\text{Eq 6}).$$

The components of the wax formulation can be combined through various different processes.

Paraffin waxes are petroleum derived and primarily derived from solvent dewaxing of lubricant basestocks. After separation of lubricant basestocks, the waxes obtained are typically slack waxes having a high oil content of 5-50%. Slack waxes can be further deoiled to an oil content of 1-5% and will be called scale wax in that case or to less than 1% oil content and would be called fully refined paraffin wax in the latter case. Depending upon the distillation cut, these waxes could belong to any of the viscosity grades as described in table 1 and thus could be a light, medium of heavy viscosity grade. Due to lower level of refining, slack waxes have a much lower market value than fully refined waxes.

As discussed earlier, light viscosity grade slack waxes typically have a higher n-paraffin content than heavy viscosity grades slack waxes and hence are preferred for use in wood and composite board coatings, since the industry perception is that higher n-paraffin content provides improved water repellency. One exception is oriented strand board construction/composite board application, where use of heavy neutral slack waxes is customary, because of use of higher processing plate temperatures, which necessitate the use of larger molecular weight waxes, which are less volatile.

In an exemplary method, coating compositions can be prepared accordingly to the steps of spraying a molten wax on to the cellulosic fiber mix or directly to the fiberboard together with application of heat and pressure. Suitable resins or binders for such application may include multifunctional isocyanates, diisocyanates, polymer dimethylene diisocyanantes, urethanes such as phenol formaldehyde resin, urea formadehyde resin, melamine formaldehyde resin, melamine urea formaldehyde resin, phenol urea formaldehyde resin, resorcinol/formaldehyde, phenol/resorcinol/formaldehyde; polyvinylacetate, polyvinyl alcohol; epoxies, acrylic resin; polysaccharides, such asstarch, dextrin, hydroxyethyl cellulose, methyl cellulose, alginates and chitosan; and proteins, such as casein, soybased glue, blood glue, hide glue and bone glue.

In another aspect, the molten wax formulation can be mixed with water and surfactants in various concentrations and further agitated with a high shear mixing equipment like a homogenizer to form a wax emulsion. This emulsion can then be either sprayed on to the cellulosic fiber mix or directly to the fiberboard or added directly into slurry prior to board formation. Emulsion formulations in some instance can lead to improved performance of the coating.

In yet another aspect, an option for making the wax (coating) composition can be to melt and homogenize the wax by stirring and heating it in a vessel at a temperature at least about 10° C. above the melting temperature of the wax. Additives, if any, can then be blended into the wax at a temperature that is at least about 5° C. to about 20° C. above the melt temperature of the additive, together with continuous stirring for sufficient time to fully dissolve or disperse the additive in the molten wax at rest. The wax composition can be sprayed on to the cellulosic fiber mix or directly to the fiberboard together with application of heat and pressure.

Methods of Manufacturing Wax Compositions as Described Herein

In an additional aspect, the disclosure provides methods of making the wax compositions as described herein. The flexibility and availability of wax product streams that can be used to make the wax compositions as described herein thereby can reduce the cost of the wax product to the customer.

In an additional aspect, the disclosure provides methods of making the wax compositions as described herein. In certain embodiments, the method includes admixing two or more paraffin waxes having a total n-paraffin content of at least 20% wt, wherein each respective wax has a 95% carbon number spread of from at least 1 carbon atom to about 23 carbon atoms, with same or different average carbon numbers and/or oil in wax contents. In certain embodiments, the method includes admixing a baseoil and/or F-T wax with two or more paraffin waxes having a total n-paraffin content of at least 20% wt, wherein each has a 95% carbon number spread of at least 1 carbon atom to about 23 carbon atoms, with same or different average carbon numbers and/or oil in wax contents. In certain embodiments, the method includes admixing two or more paraffin waxes each having a total n-paraffin content of from about 37% wt to about 57% wt, wherein each has a 95% carbon number spread of from 15 to about 21 carbon atoms.

The components of the wax formulation can be combined through various different processes known to those of skill in the art. By way of nonlimiting example, the description provides a method of making the wax compositions as described herein according to the steps of admixing the wax components, melting and homogenizing the waxes by stirring and heating the mixture in a vessel at a temperature approximately 15° C. above the melting temperature of the higher melting wax, and blending an additive, e.g., a polymer or inorganic clay or ceramic, in the wax at a temperature of approximately 5 to 20° C. above the melt temperature of the polymer together with continuous stirring for sufficient time to fully dissolve the polymer in the molten wax at rest.

In certain embodiments, the method includes a step of admixing the wax components as well as the additives and heating to a temperature sufficient to completely melt all components in the mixture while stirring.

EXAMPLES

The current state of the art in the particleboard and MDF board industry in North America uses low viscosity grade, light neutral slack waxes that have lower cost than fully refined waxes. For example, compositional analysis of a sample of a commercial product being sold in particleboard and MDF application shows that it has an average carbon number or carbon chain length of 28.3, 95% carbon number spread of 20.1, % n-paraffin content of 54.4% and oil in wax content of 12.9% (Wax 16 in Table 2). The low average carbon chain length of 28.3 corresponds to a low melt point of 125-136° F. for the wax and a SUS viscosity grade of 100-300 s. Similarly, Naudain et. al.[15] and Sheridan et. al.[16] have also described preferred waxes for use in particleboards having a melt point of 125-136° F.

An external pilot plant facility was used to manufacture the particleboards and test the sample waxes. The facility supplied and hammermilled pine chips with a 0.079 in×1.575 in screen hole size to create particleboard furnish. Emulsified waxes were applied to the furnish in a drum blender at 1.0% solids application rate with a spinning disk atomizer at 8000 rpm. A commercial fast cure polymeric diphenylmethane diisocyanate (pMDI) resin was then applied to the furnish at a rate of 1.10% solids basis in a drum blender with a spinning disk atomizer at 12000 rpm. The moisture content was targeted at 8%. Blended materials were then formed into mats measuring 28 in×28 in. The pressed panels were targeted for a density of 42 lb/ft3 and a thickness of 0.675 inches. After pressing, the panels were trimmed to 20.4 in×20.4 in and measured for out-of-press thickness and density. Tests were performed on the manufactured panels as per the ANSI A208.1-2009 Particleboard method (modified).

To graphically demonstrate the composition envelope for optimum wax performance, the % Water Absorption of the wax obtained was color coded in the manner below.

| Particle Water Absorption | |
|---|---|
| ↓ | 45.50+ |
| ↓ | 43.50-45.50 |
| ↓ | 38.50-43.50 |
| ↓ | 38.50− |
| better | |

All the wax samples tested were plotted on the % n-paraffin versus 95% C# spread plot (FIG. 1 and FIG. 3) with the color coding showing the particleboard % water absorption results based on the color scheme described above. The shaded region encloses the region described by Eq 1, Eq 2, Eq 3 and Eq 4. It can be seen that all the waxes that fall within the shaded composition envelope have a superior water repellency performance than other wax compositions outside the composition envelope, which is surprising. Data points 17 through 21 where the average carbon number of the wax composition is also varying in addition to the other compositional variables was also added to FIG. 1.

The graph shows that the optimum envelope of compositions discovered based on n-paraffin content and 95% carbon spread is applicable to all carbon numbers in the range of carbon number tested from average carbon # of 20 to 38. A limit on the optimum composition envelope is seen, however and is described by the Eq 4, limiting the lower end of n-paraffin content and Eq 3, limiting the higher end of n-paraffin content.

Figure 3:
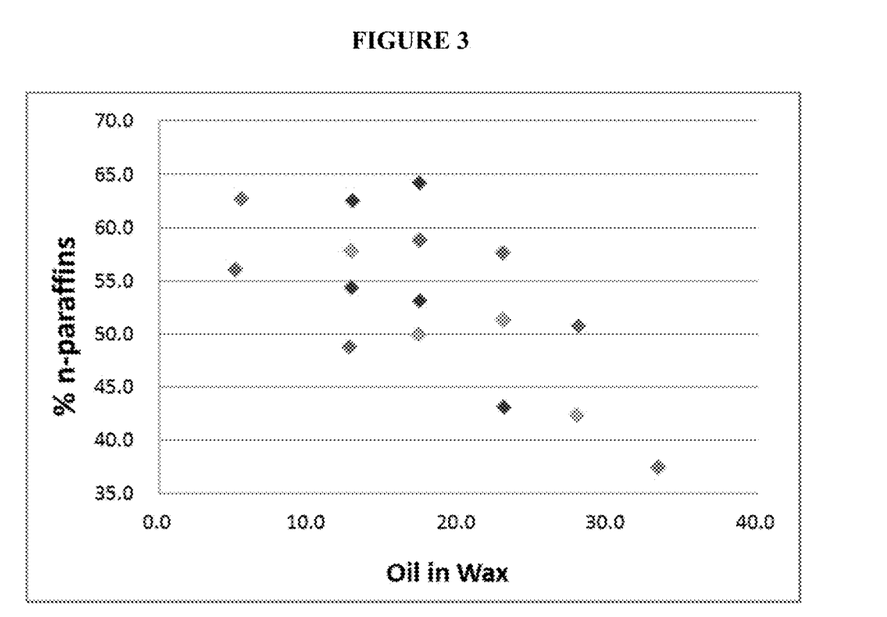
FIG. 3. Plot of % n-paraffin content versus % oil in wax (OIW) content. The graph demonstrates that the OIW content has no discernable effect on the water repellency performance of the wax.

The findings above are also illustrated by FIG. 3, where the results for the various data points were plotted in the same color coding as described above on a graph showing n-paraffin content versus oil in wax content. The graph demonstrates that the OIW content has no discernable effect on the water repellency performance of the wax (as is also demonstrated through modeling). Even though beneficial effect of n-paraffin content in the n-paraffin content range of 48-58% can be seen, the effect is not obvious because it is convoluted with 95% carbon number distribution of the wax. Hence for this reason, past literature has not been able to understand and map out the effect of wax composition on water repellency of wax because of only concentrating on a single compositional parameter at a time, either n-paraffin content or OIW and the present study provides an unobvious solution to the complete effect of wax composition on properties.

TABLE 2

Comparison of Exemplary Waxes.

| Sample Name | Avg. C# Total Paraffins | 95% Spread | % n-Paraffins | % OIW | % WA | % TS |
|---|---|---|---|---|---|---|
| Wax 1 | 27.8 | 12.8 | 48.8 | 12.7 | 37.6 | 24.60 |
| Wax 2 | 28.0 | 13.4 | 51.4 | 23.0 | 39.3 | 26.90 |
| Wax 3 | 27.9 | 13.1 | 50.0 | 17.3 | 39.3 | 24.80 |
| Wax 4 | 27.9 | 14.8 | 50.8 | 28.0 | 32.1 | 20.90 |
| Wax 5 | 28.0 | 11.4 | 58.8 | 17.4 | 35.8 | 24.30 |
| Wax 6 | 27.8 | 11.7 | 56.1 | 5.1 | 37.4 | 23.60 |
| Wax 7 | 27.9 | 13.6 | 57.7 | 23.0 | 37.0 | 23.90 |
| Wax 8 | 27.9 | 11.2 | 57.8 | 12.8 | 39.9 | 24.70 |
| Wax 9 | 27.7 | 11.5 | 62.7 | 5.5 | 43.6 | 28.20 |
| Wax 10 | 27.7 | 14.3 | 62.5 | 13.0 | 103.6 | 79.60 |
| Wax 11 | 27.5 | 16.4 | 64.2 | 17.4 | 64.2 | 44.20 |
| Wax 12 | 27.9 | 14.7 | 43.1 | 23.0 | 45.8 | 30.70 |
| Wax 13 | 27.9 | 15.5 | 42.4 | 27.9 | 38.9 | 24.20 |
| Wax 14 | 27.9 | 15.4 | 53.2 | 17.4 | 50.8 | 32.70 |
| Wax 15 | 28.0 | 16.3 | 37.5 | 33.4 | 45.2 | 26.80 |
| Wax 16 | 28.3 | 20.1 | 54.4 | 12.9 | 45.5 | 28.20 |
| Wax 17 | 38.3 | 20.5 | 47.3 | 1.0 | 56.4 | 38.20 |
| Wax 18 | 33.9 | 19.4 | 47.7 | 9.0 | 38.8 | 28.00 |
| Wax 19 | 37.7 | 18.2 | 37.5 | 15.0 | 44.1 | 31.07 |
| Wax 20 | 33.8 | 25.7 | 37.5 | 22.3 | 51.47 | 36.58 |
| Wax 21 | 29.9 | 22.7 | 37.5 | 29.7 | 46.77 | 29.15 |

Another advantage of the compositions and methods described herein is the flexibility and availability of wax product streams that can be used to make wax compositions as described herein, which can thereby reduce the cost of the wax product.

The components of the wax formulation can be combined through various different processes. By way of nonlimiting example, in the case of combining multiple wax streams, the coating composition can be formed by melting and homogenizing the waxes by stirring and heating them in a vessel at a temperature ~15° C. above the melting temperature of the higher melting wax.

Figure 2:
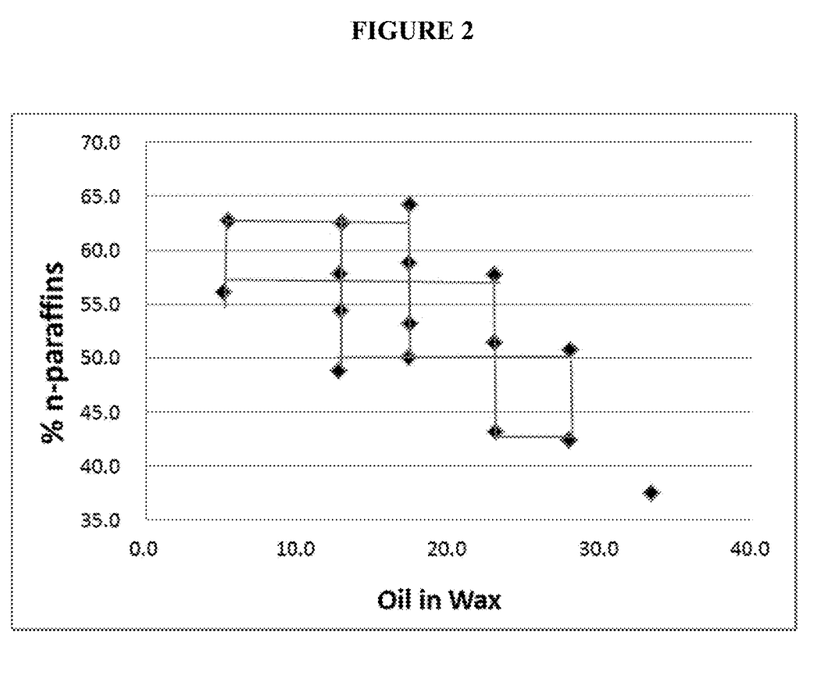
FIG. 2. Plot of % n-paraffin content versus % oil in wax content of exemplary wax formulations.

As an example, several wax samples, 1 through 15 were made through blending of individual petroleum based wax components, F-T waxes and base oils in some case to provide samples that spanned a wide range of compositional space (FIG. 2).

Wax compositions are typically measured through GC, which provides the amount of n-paraffins and the amount of non n-paraffins (primarily isoparaffins and cycloparaffins) in the wax for different carbon numbers (modified method for wax based on ASTM D5442). Also oil in wax content in wax is measured through ASTM D721 method. Using the compositional data for wax, four parameters that fully describe the composition data for a wax are computed, namely the % n-paraffin content, the % Oil in wax content, the 95% carbon number distribution of the wax and the average carbon number of the wax. The average carbon number here is defined as the average carbon chain length in the mixture of all the carbon chain lengths in the wax and the 95% carbon number spread is the average number of carbon variation in the distribution of paraffins. As used herein, 95% carbon number spread is defined as standard deviation of the total distribution*(1.96)*(2).

The wax samples were made such that the average carbon number wax was invariant for all these 15 samples and matched the sample 16 but the % n-paraffin content and % oil in wax content of these samples varied over a very wide range available for practical waxes. As shown in FIG. 1, the slack wax n-paraffin contents varied from ~37% to 65% and the oil in wax contents varied from ~5% to ~35%. Also, the 95% carbon number distributions of the wax was allowed to vary over a large range from ~11 to ~16.5.

In addition, the sample 16 is a competitive wax sample being sold for the particleboard industry and all the property data was compared against the water repellency provided by Wax 16. Finally, wax samples with varying average carbon numbers were also made (samples 17 through 21).

All these waxes were applied in an emulsion (in water) form and the resulting particleboard was evaluated for water repellency (% water absorption, % thickness swell (% TS)) properties in a typical particleboard manufacture process.

Table 2 captures the compositional parameters, % Water Absorption (% WA) and % Thickness Swell data for all the wax samples. Regression analysis performed on the water absorption data for samples 1 through 16 using 95% spread, % n-paraffin and % OIW as variables surprisingly showed that the water absorption of the wax coated boards depends simultaneously on the % n-paraffin content and the 95% spread of the wax, while no dependency on % OIW was seen.

PCT/EP Clauses:

1. A wax composition comprising a total n-paraffin content of from 30% wt to 95% wt and a 95% carbon number spread of from 1 carbon atom to 23 carbon atoms.
2. The wax composition of claim 1, wherein the composition comprises a total n-paraffin content of from 32% wt to 65% wt.
3. The wax composition of any one of claims 1-2, wherein the composition comprises a 95% carbon number spread from 8 to 23.
4. The wax composition of any of the preceding claims, wherein the wax satisfies the expression:

$$(\% \text{ npar}) > -125 + 7.25 * 95\% \text{ C\#spread} \quad (\text{Eq 4});$$

$$(\% \text{ npar}) < 79.97 - 1.62 * (95\% \text{ C\#spread}) \quad (\text{Eq 1); and}$$

$$(\% \text{ npar}) > 67.57 - 1.62 * (95\% \text{ C\#spread}) \quad (\text{Eq 2}).$$

5. The wax composition of any of the preceding claims, wherein the wax satisfies the expression:

$$\% \text{ npar} = 73.37 - 1.62 * (95\% \text{ spread}) \quad (\text{Eq 6}).$$

6. The wax composition of any of the preceding claims, wherein the wax provides particleboard water absorption of less than 45.5%.
7. The wax composition of any of the preceding claims, wherein the wax provides particleboard water absorption of less than 43.5%.
8. The wax composition of any of the preceding claims, wherein the wax provides particleboard water absorption of less than 38.5%.
9. A wax coated article comprising a composite cellulosic material having a surface including a wax coating, wherein the wax coating comprises a wax according to any one of claims 1-8.
10. The article of claim 9, wherein the composite cellulosic material is a composite wood material, particleboard, medium density fiberboard, construction board or combination thereof.
11. The article of any one of claims 9-10, wherein the coating completely or partially covers the surface of the cellulosic material.
12. The article of any one of claims 9-11, wherein the article comprises a wax coating of from 0.1% weight to 90% by weight of the cellulosic material.
13. The article of any one of claims 9-12, wherein the article has a water absorption of less than 45.5.
14. The article of any one of claims 9-13, wherein the article has a water absorption of less than 43.5.
15. The article of any one of claims 9-14, wherein the article has a water absorption of less than 38.5.
16. The article of any one of claims 9-15, wherein the wax satisfies the expression:

$$(\% \text{ npar}) > -125 + 7.25 * 95\% \text{ C\#spread} \quad (\text{Eq 4});$$

$$(\% \text{ npar}) < 79.97 - 1.62 * (95\% \text{ C\#spread}) \quad (\text{Eq 1); and}$$

$$(\% \text{ npar}) > 67.57 - 1.62 * (95\% \text{ C\#spread}) \quad (\text{Eq 2}).$$

17. The article of any one of claims 9-16, wherein the wax satisfies the expression:

$$\% \text{ npar} = 73.37 - 1.62 * (95\% \text{ spread}) \quad (\text{Eq 6}).$$

18. A method of manufacturing a wax coated cellulosic material comprising the steps of providing a cellulosic material, and applying a wax composition as described herein.

REFERENCES

The following references are incorporated herein by reference in their entirety for all purposes.
1) Hudson C. W., Hennessey, A. P., "Wax composition for construction board application", U.S. Pat. No. 6,830,614, 2004
2) Hsu O. H. H., Bender H. S., "Water repellant efficacy of wax used in hardboard", Ind. Eng. Chem. Res., 1988, 27, 1296-1300
3) Hsu W. E., Melanson R. J., Kozak P. J., "The effect of wax type and content on waferboard properties", International Particleboard/composite materials symposium, 1990, 85-93
4) Roffael E., May H., "Paraffin sizing of particleboards: chemical aspects" In. Maloney, Thomas M., ed. Proceedings, 17$^{th}$ international particleboard/composite materials symposium, 1983
5) Roffael E., Schneider T., Dix B., Beechwood T., "For waterproofing medium density fiberboard with paraffins Part 1: influence of the chemical composition of the paraffin and the type of emulsifier on the waterproofing of MDF", Wood as raw materials and composites, 2005, 63, 192-203
6) Carlson B. S., Palardy R. D., "Steam pre-heating in oriented strand board production", WO1999024233
7) PA42, Fifth edition, Vol 1, Chapter 10: Wood products industry, http://www.epa.gov/ttnchie1/ap42/ch10/final/c10s06-2.pdf
8) May H. A., Roffael E., "Hydrophobizing of particleboard with paraffins Part 4", Adhesion, 28,17-21
9) Briner G. D., Romero E., Nulla C. E., "Extender wax composition and composite panels prepared therewith", 2012, US2012/0214012
10) Buchholz T., "Use of oily soft waxes as hydrophobizing agents in timer products, timber products thus produced and processes for introducing soft waxes into timber products", U.S. Pat. No. 8,476,345
11) Buchholz T., Scheidat H. J., "Nanoparticulate wax dispersions, process for preparing them and method for hydrophobizing materials using them", U.S. Pat. No. 8,652,633
12) Buchholz T., Meyer G., Prusmann M., "Wood composition containing olefins, use of olefins for rendering raw wood materials water repellant, and methods for the production of wood materials", U.S. Pat. No. 8,231,763

13) Winterowd J. G., Bjorkman T. E., Parker E. M., "Wood composite with water repelling agent", U.S. Pat. No. 8,748,516
14) Carll C. G., "Review of thickness swell in hardboard siding", 1997, Forest products laboratory, general technical report FPL-GTR-96
15) Naudain E. L., "Method of preparing a wood particleboard", U.S. Pat. No. 3,287,479
16) Sheridan J. L., "Method of manufacturing consolidated articles by the use of steam atomized waxes", U.S. Pat. No. 3,677,808
17) Lindsay A. R., Ciruna J. A., "Method for manufacturing composite board using high oil content wax and the composite board made using high oil content wax", U.S. Pat. No. 6,183,849

While preferred embodiments of the disclosure have been shown and described herein, it will be understood that such embodiments are provided by way of example only. Numerous variations, changes and substitutions will occur to those skilled in the art without departing from the spirit of the disclosure. Accordingly, it is intended that the appended claims cover all such variations as fall within the spirit and scope of the disclosure.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A wax composition comprising a total n-paraffin content of from 32% wt to 65% wt and a 95% carbon number spread of from 8 to 23, and
wherein the wax composition satisfies the expressions:

$$(\% \text{ npar}) > -125 + 7.25 * 95\% \text{ C\#spread} \quad (\text{Eq 4});$$

$$(\% \text{ npar}) < 79.97 - 1.62 * (95\% \text{ C\#spread}) \quad (\text{Eq 1); and}$$

$$(\% \text{ npar}) > 67.57 - 1.62 * (95\% \text{ C\#spread}) \quad (\text{Eq 2}).$$

2. The wax composition of claim 1, wherein the wax composition satisfies the expression:

$$\% \text{ npar} = 73.37 - 1.62 * (95\% \text{ spread}) \quad (\text{Eq 6}).$$

3. The wax composition of claim 1, wherein the wax composition provides particleboard water absorption of less than 45.5%.

4. The wax composition of claim 1, wherein the wax composition provides particleboard water absorption of less than 43.5%.

5. The wax composition of claim 1, wherein the wax composition provides particleboard water absorption of less than 38.5%.

6. A wax coated article comprising a composite cellulosic material having a surface including a wax coating, wherein the wax coating comprises a wax composition according to claim 1.

7. The article of claim 6, wherein the composite cellulosic material is a composite wood material, particleboard, medium density fiberboard, construction board or combination thereof.

8. The article of claim 6, wherein the coating completely or partially covers the surface of the cellulosic material.

9. The article of claim 6, wherein the article comprises a wax coating of from 0.1% weight to 90% by weight of the cellulosic material.

10. The article of claim 6, wherein the article has a water absorption of less than 45.5%.

11. The article of claim 6, wherein the article has a water absorption of less than 43.5%.

12. The article of claim 6, wherein the article has a water absorption of less than 38.5%.

13. The article of claim 6, wherein the wax composition satisfies the expression:

$$\% \text{ npar} = 73.37 - 1.62 * (95\% \text{ spread}) \quad (\text{Eq 6}).$$

14. A method of manufacturing a wax coated cellulosic material comprising the steps of providing a cellulosic material, and applying a wax composition according to claim 1.

* * * * *